United States Patent [19]
Fujikawa et al.

[11] Patent Number: 5,870,618
[45] Date of Patent: Feb. 9, 1999

[54] PROCESSOR AND DATA PROCESSOR

[75] Inventors: Yoshifumi Fujikawa, Yokohama; Keiji Kojima, Sagamihara; Kiyokazu Nishioka, Odawara; Tohru Nojiri, Shinjuku-ku; Kazuhiko Tanaka, Fujisawa; Masao Ishiguro, Yokohama, all of Japan

[73] Assignee: Hitachi, Ltd., Tokyo, Japan

[21] Appl. No.: 681,180

[22] Filed: Jul. 22, 1996

[30] Foreign Application Priority Data

Aug. 3, 1995 [JP] Japan .................................. 7-198609

[51] Int. Cl.⁶ ....................................................... G06F 9/26
[52] U.S. Cl. ............................. 395/800.01; 395/800.23; 395/800.24
[58] Field of Search ..................... 395/800.23, 800.24, 395/800.25, 800.01; 345/508, 509, 524, 525

[56] References Cited

U.S. PATENT DOCUMENTS

| | | | |
|---|---|---|---|
| 5,101,489 | 3/1992 | Sato et al. | 395/425 |
| 5,437,043 | 7/1995 | Fujii et al. | 395/800 |
| 5,513,363 | 4/1996 | Kumar et al. | 395/800 |

OTHER PUBLICATIONS

Microprocessor Report, "Philips Hopes to Displace DSPs with VLIW", Brian Case, Dec. 5, 1994, pp. 12–15.
Microprocessor Report, "UltraSpace Adds Multimedia Instructions", Linley Gwennap, Dec. 5, 1994, pp. 16–18.

*Primary Examiner*—Eric Coleman
*Assistant Examiner*—Mackly Monestime
*Attorney, Agent, or Firm*—Fay Sharpe Beall Fagan Minnich & McKee

[57] ABSTRACT

An object of the present invention is to provide a processor which can execute calculation between data of a data length larger than the data length of the register file at high speed without the cost of the hardware being increased so much and the first long register 12 and the second long register 13 having a bit width which is two times of the bit width of the register file and the long register update device 14 for updating the data of the second long register 13 partially are installed between the register file 2 and the pixel calculator 11. When the long register update pixel calculation instruction is stored in the instruction register 31, the long register update device 14 connects a part of the data of the second long register 13 and a part of data read from the register file 2 and sends them to the pixel calculator 11 and the second long register 13 via the selector 15. The pixel calculator 11 executes calculation between the data of the first long register 12 and the data given from the selector 15.

4 Claims, 13 Drawing Sheets

| | | | | | | | | |
|---|---|---|---|---|---|---|---|---|
| 001: | | — | | 1dLR | R20, | R21 | | |
| 002: | | — | | 1dLRdist | R40, | R30, | R31 | |
| 003: | | — | | updLRdist | R41, | R32, | #0, | #1 |
| 004: | | — | | updLRdist | R42, | R32, | #1, | #1 |
| 005: | add | R0, | R0, R40 | updLRdist | R43, | R32, | #2, | #1 |
| 006: | add | R1, | R1, R41 | updLRdist | R40, | R32, | #3, | #1 |
| 007: | add | R2, | R2, R42 | updLRdist | R41, | R32, | #4, | #1 |
| 008: | add | R3, | R3, R43 | updLRdist | R42, | R32, | #5, | #1 |
| 009: | add | R4, | R4, R40 | updLRdist | R43, | R32, | #6, | #1 |
| 010: | add | R5, | R5, R41 | updLRdist | R40, | R32, | #7, | #1 |
| 011: | add | R6, | R6, R42 | updLRdist | R41, | R33, | #0, | #1 |
| 012: | add | R7, | R7, R43 | updLRdist | R42, | R33, | #1, | #1 |
| 013: | add | R8, | R8, R40 | updLRdist | R43, | R33, | #2, | #1 |
| 014: | add | R9, | R9, R41 | updLRdist | R40, | R33, | #3, | #1 |
| 015: | add | R10, | R10, R42 | updLRdist | R41, | R33, | #4, | #1 |
| 016: | add | R11, | R11, R43 | updLRdist | R42, | R33, | #5, | #1 |
| 017: | add | R12, | R12, R40 | updLRdist | R43, | R33, | #6, | #1 |
| 018: | add | R13, | R13, R41 | — | | | | |
| 019: | add | R14, | R14, R42 | — | | | | |
| 020: | add | R15, | R15, R43 | — | | | | |

FIG. 8
PRIOR ART

| | | | | | |
|---|---|---|---|---|---|
| 001 : | — | | dist | R40, R20, R30 | |
| 002 : | align | R34, R30, R31, #1 | dist | R41, R21, R31 | |
| 003 : | add | R0, R0, R40 | align | R35, R31, R32, #1 | |
| 004 : | add | R0, R0, R41 | dist | R42, R20, R34 | |
| 005 : | align | R34, R30, R31, #2 | dist | R43, R21, R35 | |
| 006 : | add | R1, R1, R42 | align | R35, R31, R32, #2 | |
| 007 : | add | R1, R1, R43 | dist | R40, R20, R34 | |
| 008 : | align | R34, R30, R31, #3 | dist | R41, R21, R35 | |
| 009 : | add | R2, R2, R40 | align | R35, R31, R32, #3 | |
| 010 : | add | R2, R2, R41 | dist | R42, R20, R34 | |
| 011 : | align | R34, R30, R31, #4 | dist | R43, R21, R35 | |
| 012 : | add | R3, R3, R42 | align | R35, R31, R32, #4 | |
| 013 : | add | R3, R3, R43 | dist | R40, R20, R34 | |
| 014 : | align | R34, R30, R31, #5 | dist | R41, R21, R35 | |
| 015 : | add | R4, R4, R40 | align | R35, R31, R32, #5 | |
| 016 : | add | R4, R4, R41 | dist | R42, R20, R34 | |
| 017 : | align | R34, R30, R31, #6 | dist | R43, R21, R35 | |
| 018 : | add | R5, R5, R42 | align | R35, R31, R32, #6 | |
| 019 : | add | R5, R5, R43 | dist | R40, R20, R34 | |
| 020 : | align | R34, R30, R31, #7 | dist | R41, R21, R35 | |
| 021 : | add | R6, R6, R40 | align | R35, R31, R32, #7 | |
| 022 : | add | R6, R6, R41 | dist | R42, R20, R34 | |
| 023 : | — | | dist | R43, R21, R35 | |
| 024 : | add | R7, R7, R42 | align | — | |
| 025 : | add | R7, R7, R43 | dist | R40, R20, R31 | |
| 026 : | align | R34, R31, R32, #1 | dist | R41, R21, R32 | |
| 027 : | add | R8, R8, R40 | align | R35, R32, R33, #1 | |
| 028 : | add | R8, R8, R41 | dist | R42, R20, R34 | |
| 029 : | align | R34, R31, R32, #2 | dist | R43, R21, R35 | |
| 030 : | add | R9, R9, R42 | align | R35, R32, R33, #2 | |
| 031 : | add | R9, R9, R43 | dist | R40, R20, R34 | |
| 032 : | align | R34, R31, R32, #3 | dist | R41, R21, R35 | |
| 033 : | add | R10, R10, R40 | align | R35, R32, R33, #3 | |
| 034 : | add | R10, R10, R41 | dist | R42, R20, R34 | |
| 035 : | align | R34, R31, R32, #4 | dist | R43, R21, R35 | |
| 036 : | add | R11, R11, R42 | align | R35, R32, R33, #4 | |
| 037 : | add | R11, R11, R43 | dist | R40, R20, R34 | |
| 038 : | align | R34, R31, R32, #5 | dist | R41, R21, R35 | |
| 039 : | add | R12, R12, R40 | align | R35, R32, R33, #5 | |
| 040 : | add | R12, R12, R41 | dist | R42, R20, R34 | |
| 041 : | align | R34, R31, R32, #6 | dist | R43, R21, R35 | |
| 042 : | add | R13, R13, R42 | align | R35, R32, R33, #6 | |
| 043 : | add | R13, R13, R43 | dist | R40, R20, R34 | |
| 044 : | align | R34, R31, R32, #7 | dist | R41, R21, R35 | |
| 045 : | add | R14, R14, R40 | align | R35, R32, R33, #7 | |
| 046 : | add | R14, R14, R41 | dist | R42, R20, R34 | |
| 047 : | — | | dist | R43, R21, R35 | |
| 048 : | add | R15, R15, R42 | — | | |
| 049 : | add | R15, R15, R43 | — | | |

PROCESSOR AND DATA PROCESSOR

[BACKGROUND OF THE INVENTION]

1. Field of the Invention

The present invention relates to a processor of the stored program system and more particularly to a constitution favorably applied to processing of multimedia data including moving picture data and others.

2. Description of the Related Art

As a system for compressing moving picture data, there is a system known as ISO/MPEG. In this system, a portion where images are mutually approximated between a plurality of frames constituting a moving picture is searched so as to compensate for the motion. By encoding a change of the position of the portion where images are mutually approximated as a motion vector indicating the motion of the moving picture, the moving picture data is compressed.

Figure 10:
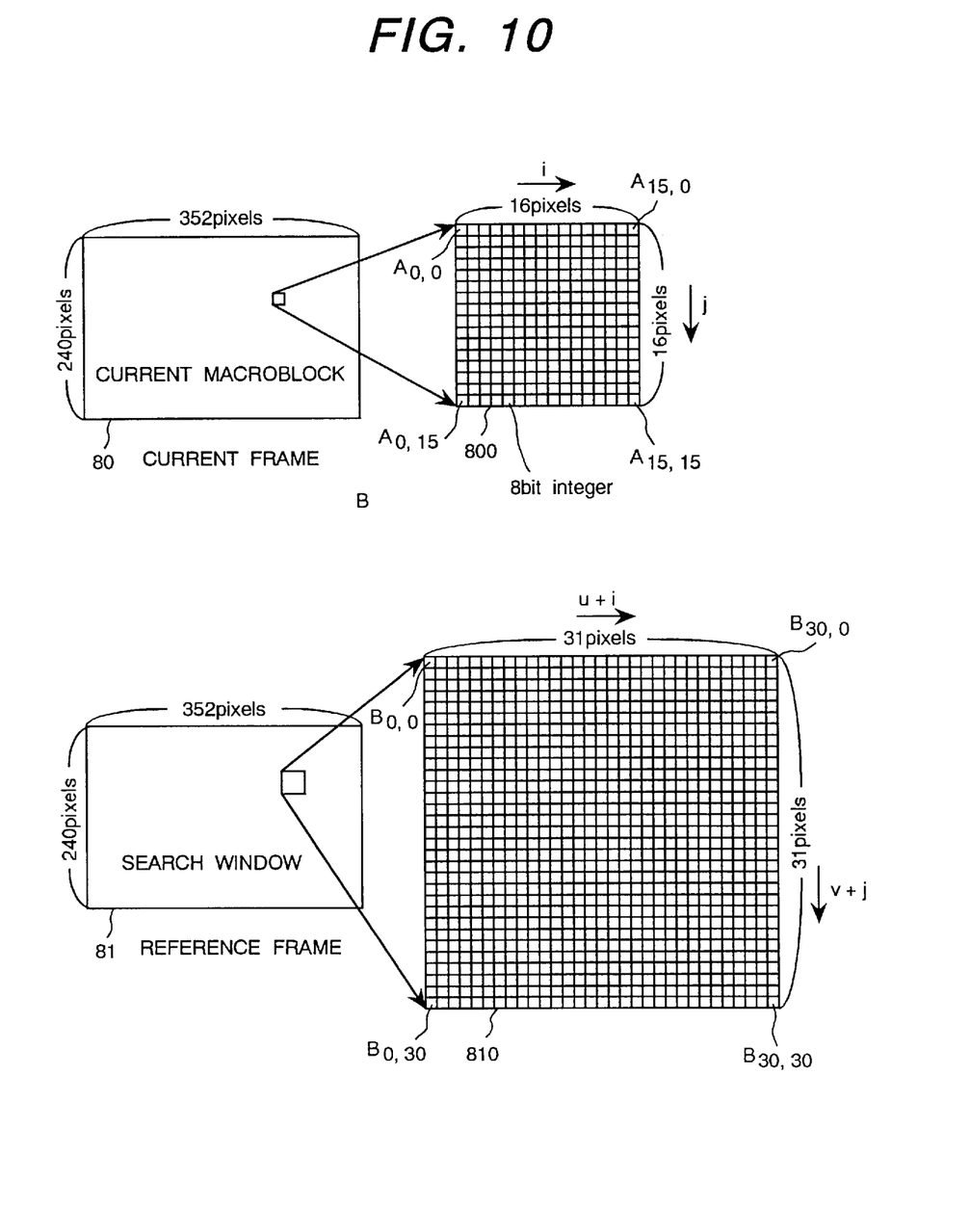
FIG. 10 is a drawing showing the search range of an approximate pixel block between frames executed by the moving picture data compression process.

This search is executed by retrieving a portion of the search window in the reference frame 81 shown in FIG. 10 to which an image in the region of 16 pixels by 16 pixels called a current macroblock in the current frame 80 shown in FIG. 10 is approximated most.

For evaluation of approximation between images, the evaluation formula indicated by Formula 1 is widely used.

$$f(u, v) = \sum_{j=0}^{15} \sum_{i=0}^{15} |A_{i,j} - B_{u+i,v+j}| \qquad (1)$$

When this evaluation formula is used, the aforementioned search is executed by searching a combination of (u, v) at which the value of this evaluation formula is minimized.

As a conventional processor for calculating the evaluation formula of Formula 1 at high speed, there exists Ultra SPARC of SUN Microsystems described on page 16 of "MICROPROCESSOR REPORT, DEC. 5, 1994".

$$d = \sum_{i=0}^{7} |X_i - Y_i| \qquad (2)$$

Figure 11:
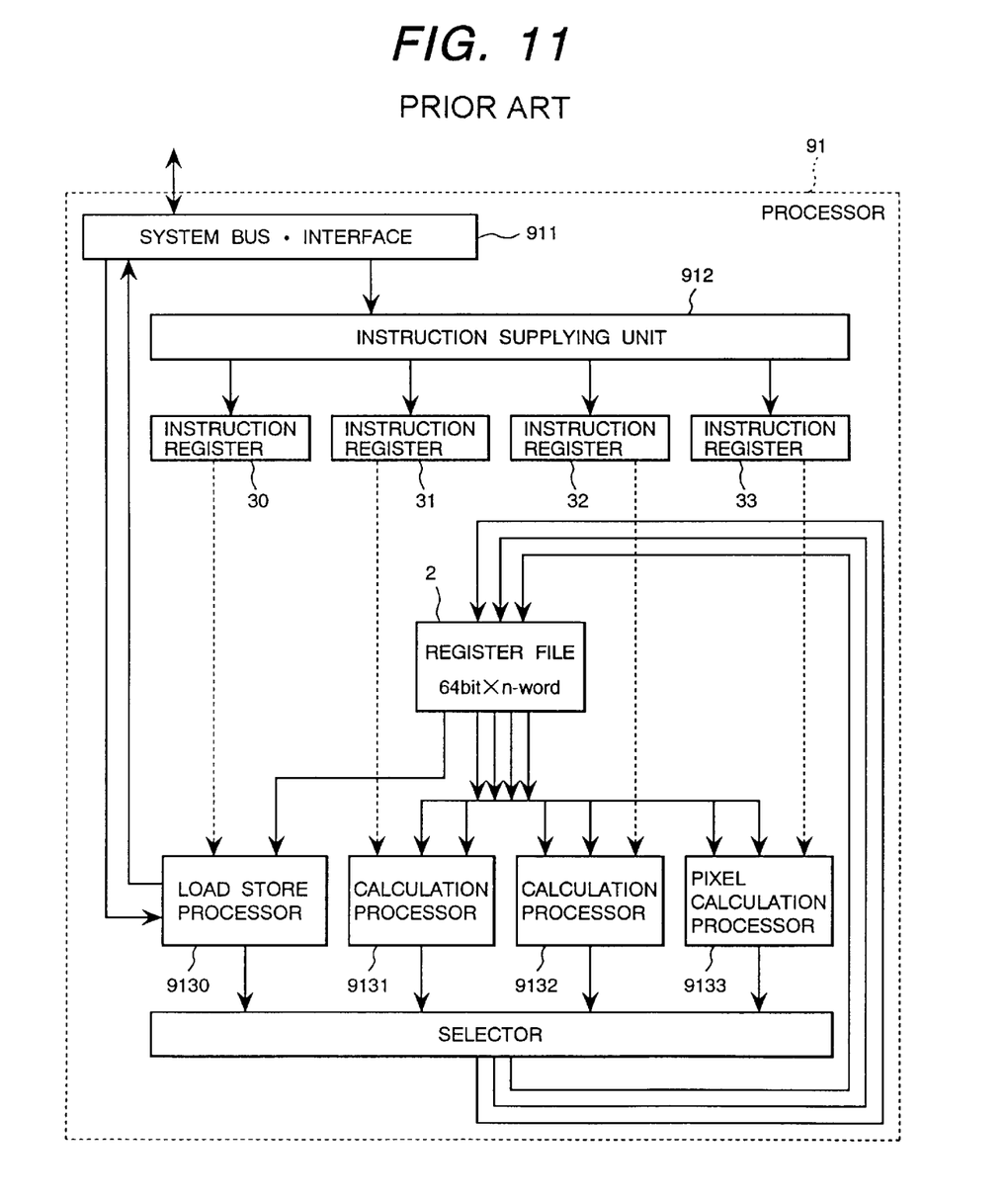
FIG. 11 is a block diagram showing the constitution of conventional processor.

An outline of the constitution of this processor is shown in FIG. 11.

As shown in the drawing, this processor comprises a load store processor 9130, a pixel calculation processor 9133 for executing the calculation shown in Formula 2, a plurality of calculation processors 9131 and 9132 for executing the other calculations, a register file including a plurality of registers of 64-bit width, instruction registers 30 to 33 installed in correspondence with each processor, an instruction supplying unit 912 for supplying instructions to the instruction registers 30 to 33, and a system bus interface for controlling input and output with the system bus to which the main storage storing an instruction string is connected.

Figure 12:
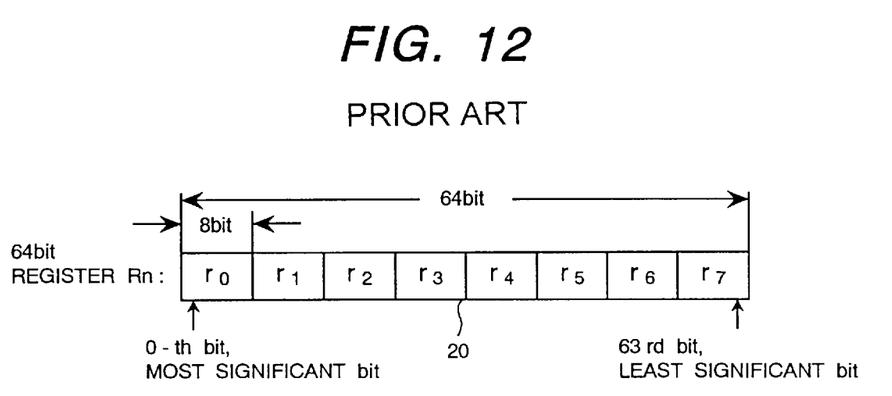
FIG. 12 is a drawing showing the storing status of brightness data in a register file of a conventional processor.

The pixel calculation processor 9133 handles data read from the register file as a set of 8 8-bit data as shown in FIG. 12. The pixel calculation processor 9133 executes the calculation shown in Formula 2 for 2 sets of 8 8-bit data read from the register file.

Figure 13:
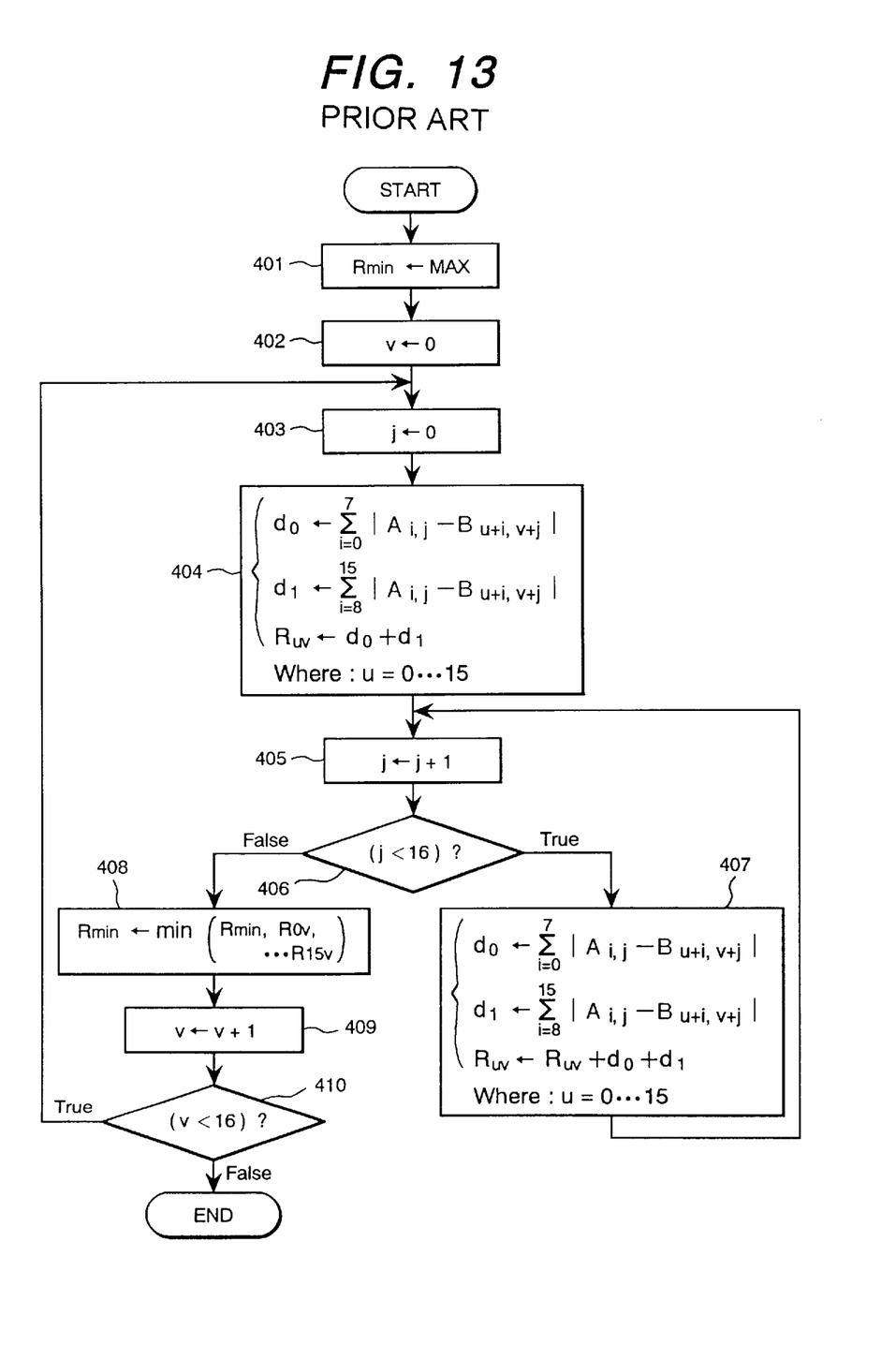
FIG. 13 is a flow chart showing the approximate pixel block searching procedure of a conventional processor.

In this processor, the process for finding a combination of (u, v) for minimizing Formula 1 using a calculation instruction for permitting the pixel calculation processor 9133 to execute the calculation of Formula 2 is realized according to the procedure shown in FIG. 13.

Namely, Step 404 shown in FIG. 13 is executed repeatedly for each v of 0 to 15 by the functions of Steps 402, 409, and 410. Step 407 is also executed for each v of 0 to 15. Furthermore, it is executed repeatedly for each j value between 1 to 15 by the functions of Steps 403, 405, and 406 for each v value.

Next, as explained using r (j, u, v) defined by Formula 3, at Steps 404 and 407 shown in FIG. 13, r (j, u, v) is obtained for each combination (j, u, v) of j between 0 and 15 and v between 0 and 15 for each u value between 0 and 15 during the aforementioned repetitive process. At Step 404, r (j, u, v) is obtained for j=0 and at Step 407, r (j, u, v) is obtained for j between 1 and 15.

$$r(j, u, v) = \sum_{i=0}^{15} |A_{i,j} - B_{u+i,v+j}| \qquad (3)$$

At these steps, during the aforementioned processing, the sum of r (j, u, v) obtained for each j between 0 and 15 for the same combination of (u, v) is obtained as Ruv. This is realized by fixing v, obtaining r (0, u, v) for j=0 for each u between 0 and 15 at Step 404, obtaining r (j, u, v) for each j between 1 and 15 for each u between 0 and 15 at Step 407, adding it to a parameter Ruv provided for each combination of u and v, and executing the process for each v between 0 and 15.

Only an Ruv obtained which is smaller than the Ruv obtained previously is left (Step 408) and the combination of (u, v) corresponding to the Ruv left last is taken as (u, v) for minimizing Formula 1. In this case, to calculate R (j, u, v) for a specific combination of (j, u, v), it is necessary to execute the calculation indicated by Formula 2 two times for each i between 0 and 7 and each i between 8 and 15 respectively. As a result, in this processor, it is necessary to execute the calculation indicated by Formula 2, data reading as a preprocess for this calculation, and generation of data to be used for calculation enormous times.

Needless to say, by narrowing the aforementioned search window, it is possible to decrease the number of calculations and speed up the processing. However, by doing this, the compression efficiency decreases and the quality of moving pictures lowers.

Therefore, it can be considered to speed up the processing by expanding the calculation indicated by Formula 1 so as to execute by one instruction.

However, for that purpose, it is necessary to increase the input bit width of the pixel calculation processor 9133 and also increase the bit width of the register file so as to handle a lot of pixel data at the same time. By doing this, the scale of the register file increases. Furthermore, the calculation processors 9131 to 9133 other than the pixel calculation processor 9133 do not require data with such a bit width, so that it is not considered as an efficient method as a whole.

By increasing the number of data which can be read from the register file and permitting a plurality of pixel calculation processors to execute the calculation of Formula 2 in parallel, it is considered to speed up the processing. However, even in such a case, the scale of the hardware increases remarkably and the cost of the hardware increases extremely.

[SUMMARY OF THE INVENTION]

An object of the present invention is to provide a processor which can execute calculation of data with a data length larger than the data length of the register file at high speed without the cost of the hardware being increased so much.

To accomplish the above object, the present invention provides a processor having a register file comprising a plurality of registers of N-bit width including at least two registers which can read data in parallel, wherein the processor comprises an instruction register for storing an instruction, a first long register of M-bit width (M>N), an update device for generating data of M-bit width obtained by replacing a part of data read from the first long register with a part of data read from the register file according to the instruction stored in the instruction register, a selection device for selecting one of data of M-bit width connected to data read from a plurality of registers of the register file in parallel and the aforementioned data of M-bit width generated by the update device according to the instruction stored in the instruction register, and a calculator for executing the predetermined calculation for the data of M-bit width selected by the selection device according to the instruction stored in the instruction register and the first long register stores the data of M-bit width selected by the selection device according to the instruction stored in the instruction register. Furthermore, the present invention provides a processor as mentioned above further comprising a second long register which is a register of M-bit width for storing the data of M-bit width connected to data read from a plurality of registers of the register file in parallel according to the instruction stored in the instruction register, wherein the calculator executes the predetermined calculation between the data of M-bit width selected by the selection device and the data of M-bit width read from the second long register according to the instruction stored in the instruction register.

According to the processor of the present invention, for example, when a specific instruction is stored in the instruction register first, the selection device selects the data of M-bit width connected to data read from a plurality of registers of the register file in parallel and the first long register stores the data of M-bit width selected by the selection device.

When another specific instruction is stored in the instruction register thereafter, the update device generates data of M-bit width obtained by replacing a part of data read from the first long register with a part of data read from the register file, and the selection device selects the data of M-bit width generated by the update device, and the first long register stores the data of M-bit width selected by the selection device, and the calculator executes the predetermined calculation for the data of M-bit width selected by the selection device. Namely, whenever another specific instruction is given as mentioned above, a part of data of M-bit width stored in the first long register is replaced with a part of data read from the register file so as to update the data of M-bit width and the updated data of M-bit width is calculated.

Therefore, it is possible to update data of a bit width larger than the bit width of the register file partially and calculate the updated data for one instruction and the processing can be speeded up. Furthermore, the bit width of the register file may be smaller than the bit width of data to be calculated, so that the cost of the hardware will not be increased so much.

Namely, according to the present invention, a processor which can execute calculation between data of a data length larger than the data length of the register file at high speed can be provided without the cost of the hardware being increased so much.

[BRIEF DESCRIPTION OF THE DRAWINGS]

FIG. 8 is a drawing showing a program example of a conventional processor.

[DESCRIPTION OF THE PREFERRED EMBODIMENT]

An embodiment of the present invention will be explained hereunder.

Figure 1:
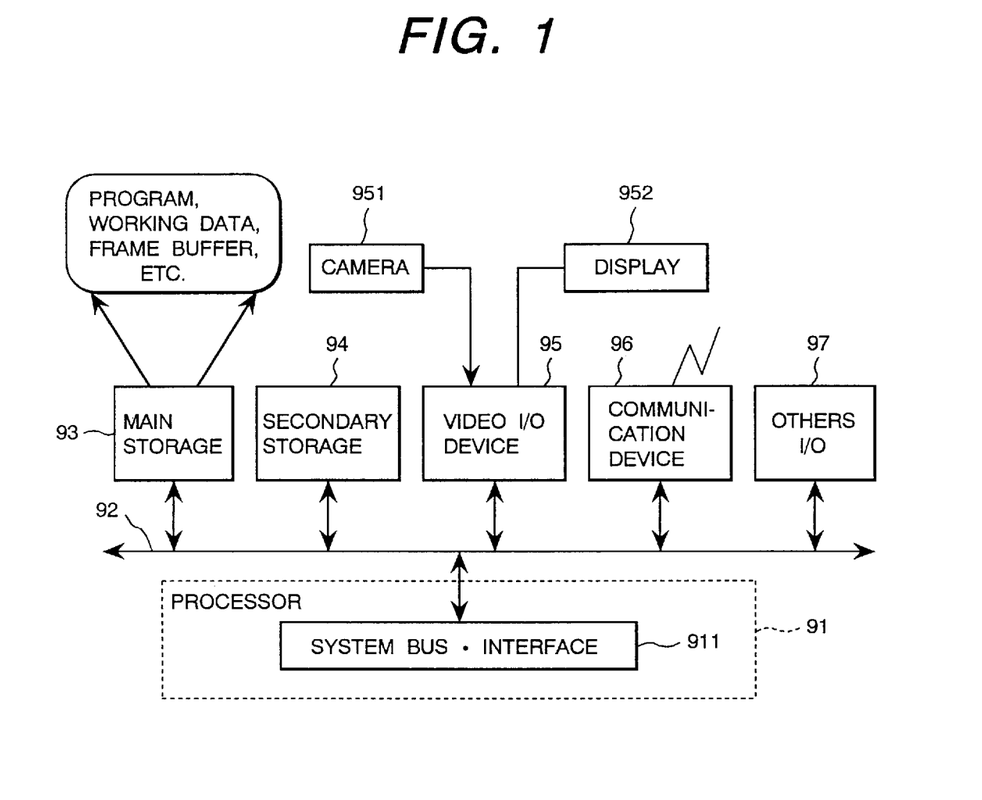
FIG. 1 a block diagram showing the constitution of a moving picture processing system of an embodiment of the present invention.

FIG. 1 shows the constitution of a moving picture processing system to which the processor of this embodiment is applied. In the drawing, numeral 91 indicates a processor of this embodiment and the processor 91 is connected to a main storage 93 via a system bus 92. The processor 91 is also connected to a secondary storage 94, a communication device 96, a video I/O device 95, and other I/O devices 97 via the system bus 92. Programs and other working data are stored in the main storage 93. A frame buffer for storing data indicating images is also installed in the main storage 93. The video I/O device 95 inputs or outputs video signals between a video camera 951 for picking up moving pictures and a display 952 for displaying moving pictures.

In the moving picture processing system having the aforementioned constitution, data of moving pictures fetched from the video camera 951 by the video I/O device 95 is transferred to the frame buffer in the main storage 93. The moving picture data in the main storage 93 is processed by the processor 91 and the result thereof is stored in the secondary storage 94 or sent to another system by the communication device 96.

Figure 2:
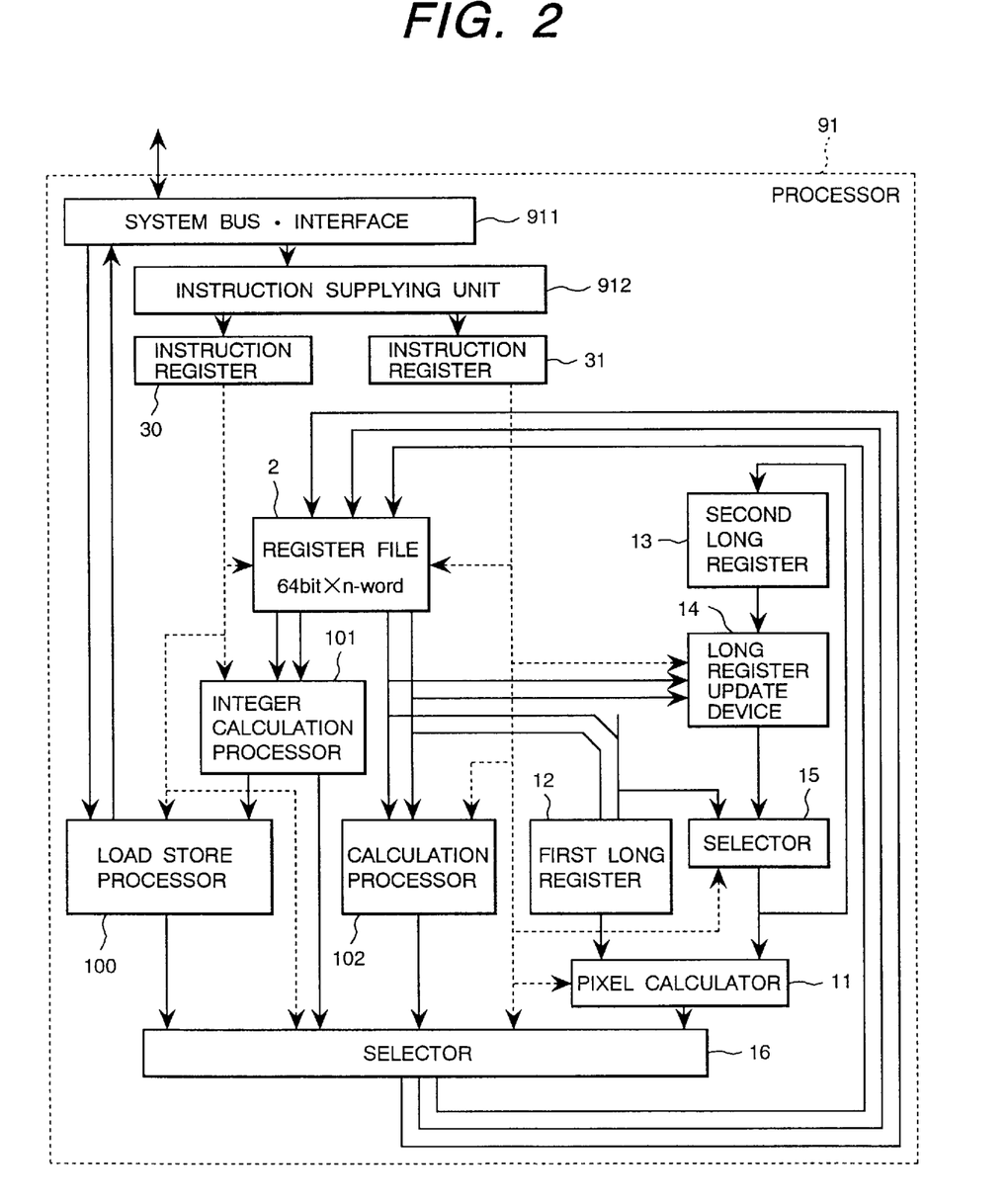
FIG. 2 is a block diagram showing the constitution of a processor of an embodiment of the present invention.

Next, the internal constitution of the processor 91 of this embodiment is shown in FIG. 2.

Figure 3:
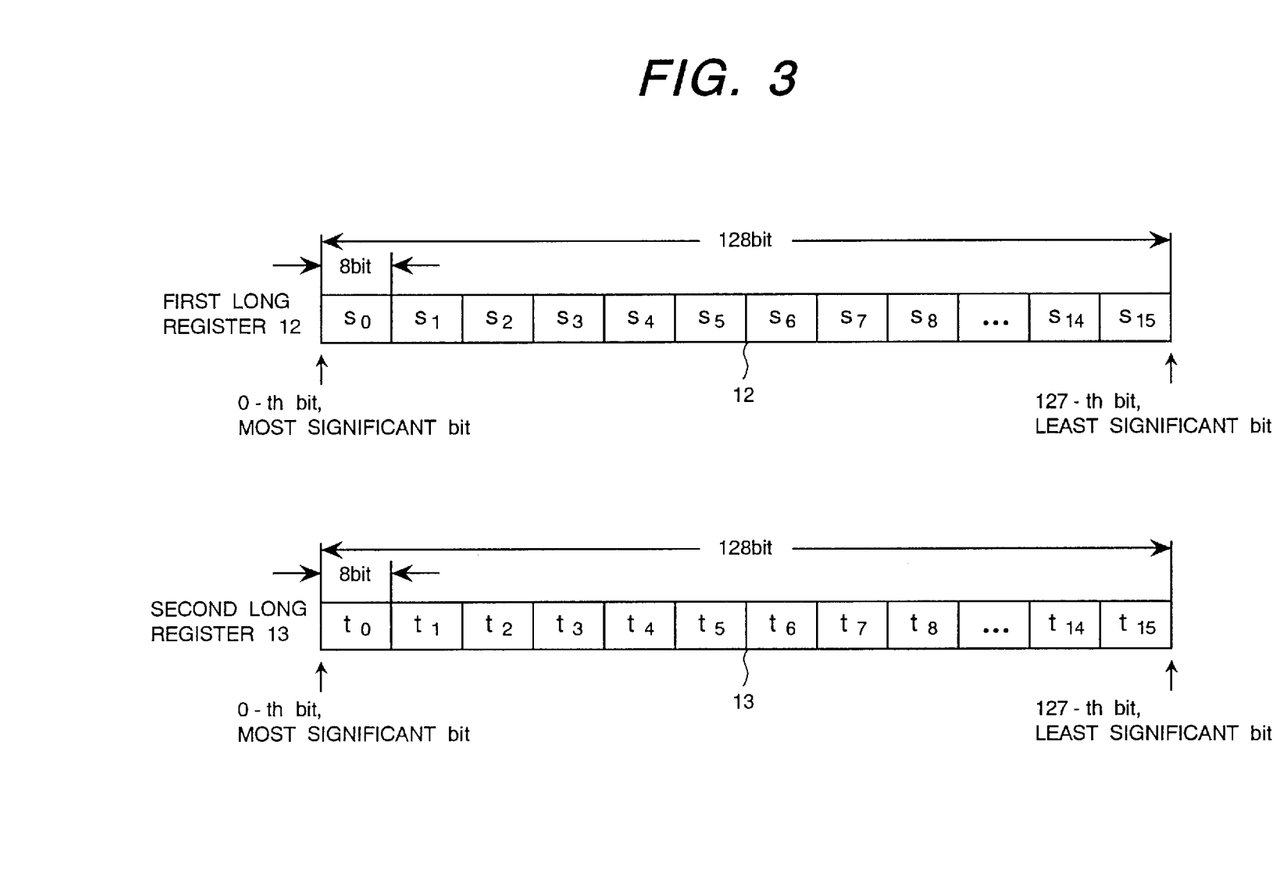
FIG. 3 is a drawing showing first and second long registers of embodiment of the present invention.

As shown in the drawing, the processor 91 of this embodiment comprises a register file 2 of 64-bit width having four reading ports and three writing ports, an integer calculation processor 101, an another-instruction calculation processor 102, instruction registers 30 and 31 installed in correspondence with each calculation processor, a load store processor 100, an instruction supplying unit 912, and a system bus interface 911. Furthermore, as shown in FIG. 3, the processor 91 comprises a first long register 12 and a second long register 13 of 128-bit width which is two times of the bit width of the register file, a pixel calculator 11 for processing two input data of 128-bit width, and a long register update device 14 for updating the contents of the second long register 13.

The register file 2 comprises, for example, 64 registers of 64-bit width R0 to R63 and can read data from the four registers and write data into the three registers at the same time by using the four reading ports and three writing ports.

In the frame buffer in the main storage 93 shown in FIG. 1, an array of brightness data of 8-bit width per pixel indicating the pixel brightness is stored for each frame constituting a moving picture is stored as moving picture data. When a moving picture is colored, for example, an array of two types of color data of 8-bit width per pixel indicating the color components is also stored as moving picture data.

The brightness data to be used for calculation among the brightness data stored in the main storage 93 is read by the main storage 91 under control of the load store processor 100 prior to calculation and stored in the register file 2 via the system bus interface 911 and a selector 16. In each register of the register file 2, 8-bit brightness data is stored as shown in FIG. 12 previously.

Program instructions stored in the main storage 93 shown in FIG. 1 are read by the instruction supplying unit 912 sequentially via the system bus interface 911 and stored in the instruction 30 or the instruction register 31 shown in FIG. 2 according to the type of instruction.

According to the instruction in the instruction register 31, two of the four reading ports of the register file 2, the another-instruction calculation processor 101, the pixel calculator 11, the long register update device 14, a pixel calculation source selector 15, the selector 16, and the writing ports of the register file 2 are controlled.

Also according to the instruction information in the instruction register 30, two of the four reading ports of the register file 2, the integer calculation processor 101, the load store processor 100, the selector 16, and the writing ports of the register file 2 are controlled. Loading of the aforementioned brightness data into the register file 2 from the main storage 93 is executed by the load store processor 100 also according to the instruction stored in the instruction register 30.

One instruction stored in the instruction register 30 and one instruction stored in the instruction register 31 can be executed in parallel at the same time. Reading and writing of the register file 2 in correspondence with execution of these instructions can be executed in parallel at the same time.

The processor of this embodiment having the aforementioned constitution supports the three following characteristic instructions of a load instruction, a store instruction, and an addition instruction. Namely, the processor supports three instructions such as the long register store instruction, the long register store pixel calculation instruction, and the long register update pixel calculation instruction.

These instructions are stored in the instruction register 31 by the instruction supplying unit 912.

When the long register store instruction is stored in the instruction register 31, two registers of the register file 2 are selected according to the information of the instruction register 31 and two data of 64-bit width stored in these two registers are outputted to two reading ports in parallel. Data of 128-bit width connected to the two outputted data is stored in the first long register 12.

When the long register store pixel calculation instruction is stored in the instruction register 31 next, in the same way as with the long register store instruction, two registers of the register file 2 are selected according to the information of the instruction register 31 and two data of 64-bit width are outputted to reading ports. Data of 128-bit width connected to the two outputted data is transmitted to the pixel calculation source selector 15.

The pixel calculation source selector 15 selects and outputs the connected data of 128-bit width. The data outputted from the pixel calculation source selector 15 is transmitted to the second long register 31 and the pixel calculator 11. In this case, the data of 128-bit width stored in the first long register 12 is also transmitted to the pixel calculator 11.

The data of 128-bit width transmitted to the second long register 13 is stored in the second long register 13. On the other hand, the pixel calculator 11 executes pixel calculation between the data of 128-bit width transmitted from the first long register 12 and the data of 128-bit width transmitted from the pixel calculation source selector 15. The result of pixel calculation is stored in the register of the register file 2 specified by the instruction of the instruction register 31.

Figure 4:
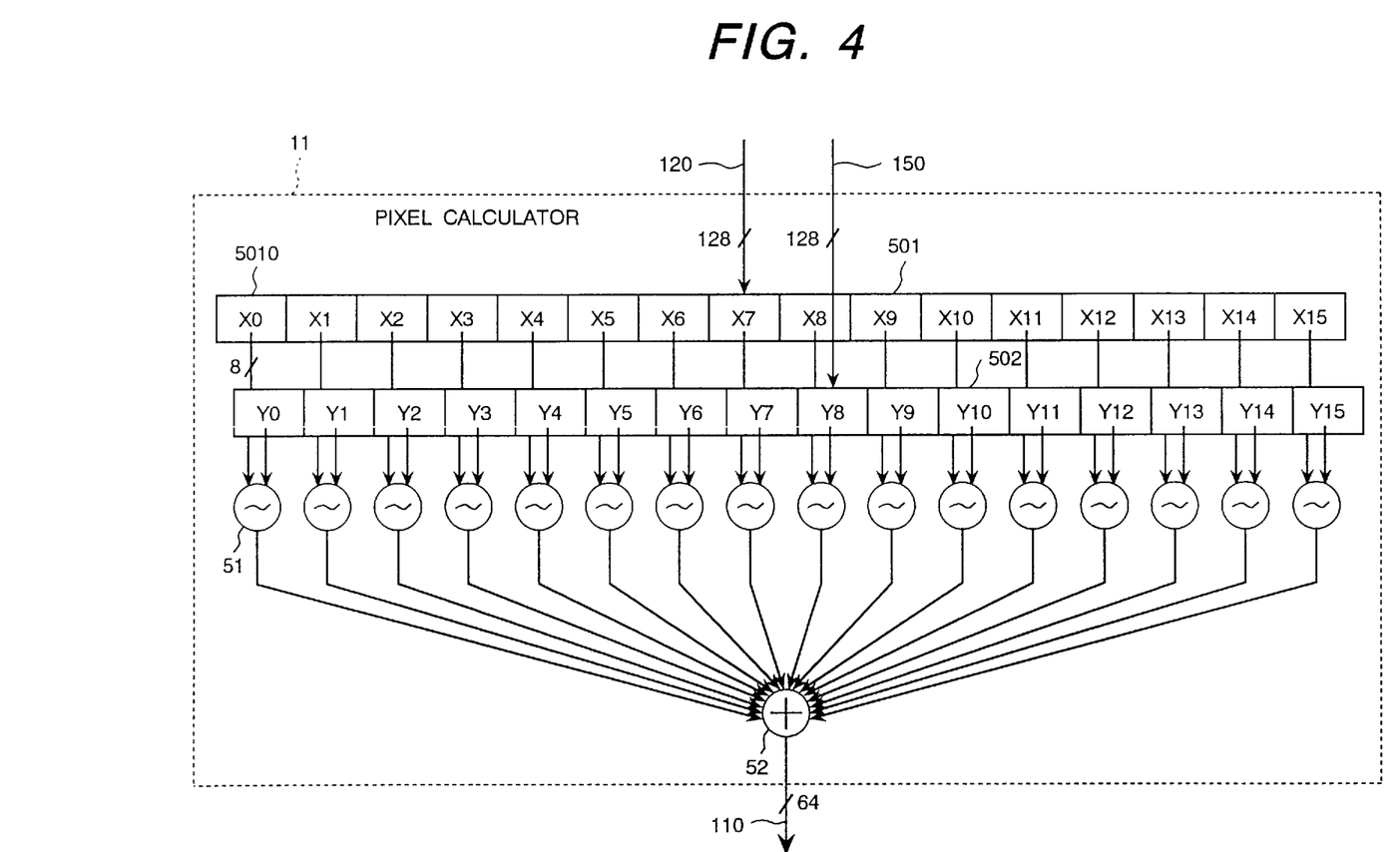
FIG. 4 is a block diagram showing the constitution of a pixel calculator of an embodiment of the present invention.

The internal constitution of the pixel calculator 11 is shown in FIG. 4.

As shown in the drawing, the pixel calculator 11 regards first pixel calculation source data 501 and second pixel calculation source data 502 which are two data of 128-bit width inputted from the first long register 12 and the pixel calculation source selector 15 as an array of 16 numeric data of 8-bit width such as "pixel calculation source element data x0 5010" respectively and calculates the formula indicated by Formula 4.

$$D = \sum_{i=0}^{15} |X_i - Y_i| \qquad (4)$$

Each difference calculator 51 is a calculator for calculating the absolute value of the difference between two inputted pixel calculation source element data and a multi-input adder 52 is a calculator for calculating the total of the result of each difference calculator 51. The total is outputted as data of 64-bit width. In this embodiment, a carry to the 65th bit is ignored.

When the long register update pixel calculation instruction is stored in the instruction register 31 next, one register of the register file 2 is selected according to the information of the instruction register 31 and data of 64-bit width is outputted to one reading port and transmitted to the long register update device 14. The position information and shift information included in the instruction of the instruction register 31 are transmitted to the long register update device 14. The contents of the second long register 13 are also transmitted to the long register update device 14 in parallel with it.

Figure 5:
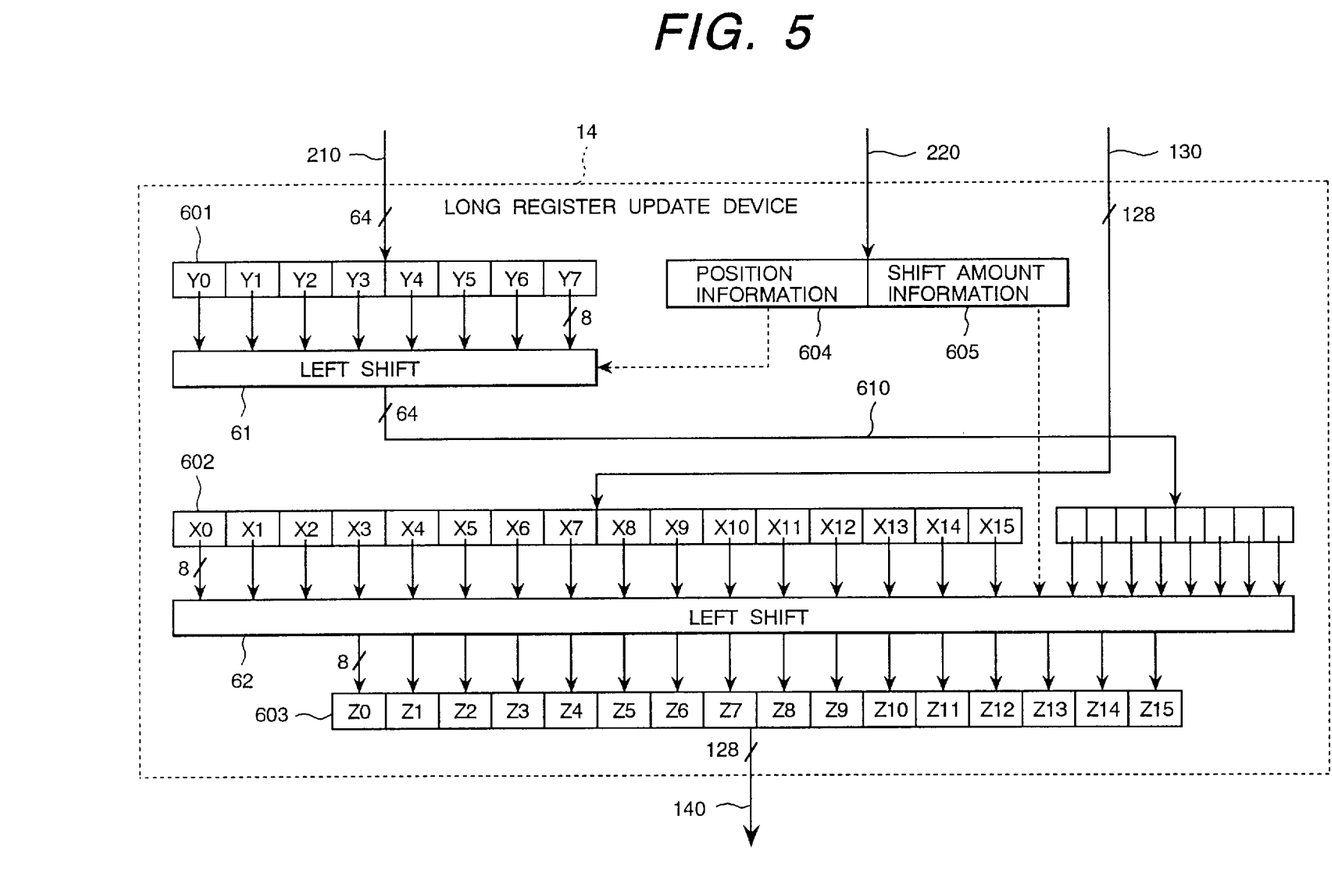
FIG. 5 is a block diagram showing the constitution of a long register update device of an embodiment of the present invention.

The internal constitution of the long register update device 14 is shown in FIG. 5.

As shown in the drawing, data of 64-bit width read from one register in the register file 2 is transmitted to the long register update device 14 as connection source data 601 via a first source data line 210 according to the instruction of the instruction register 31. Position information 604 and shift information 605 included in the instruction in the instruction register 31 are transmitted via a second source data line 220.

The connection source data 601 is shifted to the left by a connection source data shifter 61 according to the position information 604. The shift amount when the numerical value of the position information 604 is taken as n is 8n bits. The connection source data 601 is shifted to the left by n-element data (brightness data of n pixels) by it and outputted as a connection source data shifter output signal 610 which is data of 64-bit width remaining in the connection source data shifter 61 after shifting.

The data of 64-bit width of the connection source data shifter output signal 610 and connection destination data 602 which is data of 126-bit width inputted from the second long register 13 via a second long register output data line 130 are connected to each other and transmitted to a connection shifter 62. The connection shifter 62 shifts the connected data of 192-bit width to the left according to the shift amount information 605 and outputs the 128-bit data on the left side onto a long register update data line 140 as a shift result. The shift amount when the numerical value of the shift amount information 605 is taken as n is 8n bits. It is possible to generate data by shifting the content of the second long register 13 to the left for optional pixels by the aforementioned long register update device 14 and filling the empty area obtained on the right with optional neighboring pixels on the first source data line 210.

The data of 128-bit width 140 (output of the connection shifter 62) outputted from the long register update device 14 is transmitted to the pixel calculation source selector 15 via the long register update data line 140. The pixel calculation source selector 15 selects and outputs data on the long register update data line 140.

Output data from the pixel calculation source selector 15 is transmitted to the second long register 13 and the pixel calculator 11. The data stored in the first long register 12 is also transmitted to the pixel calculator 11 in parallel with it.

The data transmitted to the second long register 13 is stored in the second long register 13.

On the other hand, the pixel calculator 11, as mentioned above, executes calculation between the data transmitted from the first long register 12 and the data transmitted from the pixel calculation source selector 15. The result of pixel calculation is stored in the register of the register file 2 specified by the instruction of the instruction register 31.

How the three instructions supported by the processor 91 of this embodiment are executed are explained above.

Next, how the process for obtaining values of r (j, u, v) of Formula 3 from u=0 to u=15 which is executed at Step 404 or Step 407 in the process shown in FIG. 13 previously is realized for a specific combination of (j, v) by using these three instructions will be explained.

Figure 6:
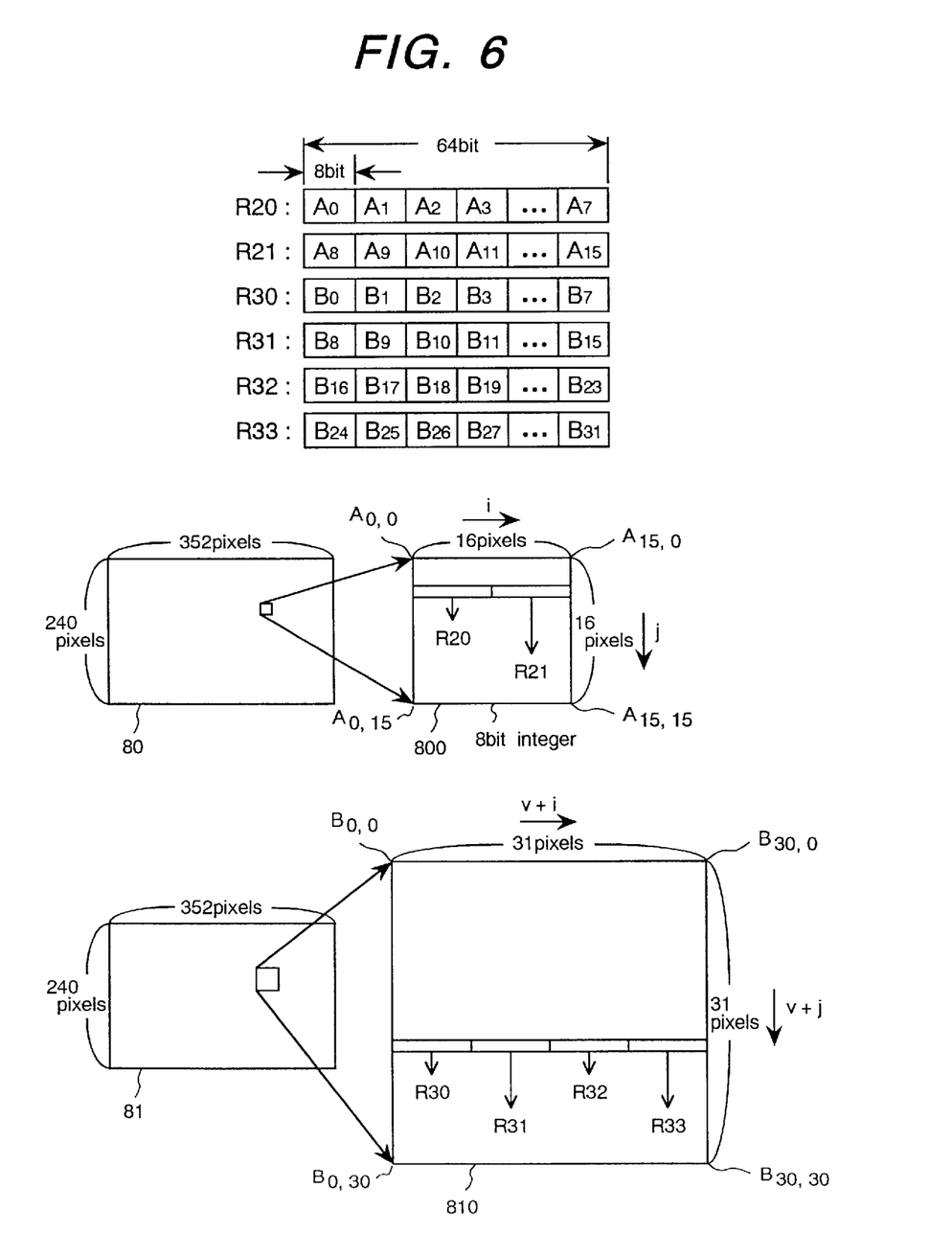
FIG. 6 is a drawing showing the storing status of brightness data in a register file of an embodiment of the present invention.

The process for obtaining values of r (j, u, v) of Formula 3 from u=0 to u=15 for a specific combination of (j, v) is equivalent to a process for obtaining the difference between each of 16 combinations of 16 pixels selected by shifting the pixels at the left end to the right sequentially one by one starting from a specific line of the search window shown in FIG. 6 and the brightness data of 16 pixels on a specific line of the current macroblock of the current frame and obtaining the total thereof.

Firstly, prior to this calculation, as mentioned above, the brightness data of 16 pixels on a specific line of the current macroblock of the current frame is stored in registers R20 and R21 of the register file 2. The relation between brightness data to be stored and pixels is as shown in FIG. 6, and the 8 pixels on the left are stored in the register R20, and the 8 pixels on the right are stored in the register R21. Brightness data of 31 pixels on a specific line of the search window is also stored in registers R30 to R33 of the register file 2.

The relation between brightness data to be stored and pixels is as shown in FIG. 6 and each 8 pixels are sequentially stored in the order of R30, R31, and R32 starting from the left side. The lateral size of the search window is 31 pixels, so that in the 8 bits at the right end of R32, brightness data of pixels not to be used for calculation is stored or brightness data is stored.

Next, the formats of the long register store instruction, the long register store pixel calculation instruction, the long register update pixel calculation instruction, and the addition instruction used in this processing are shown in Table 1.

LR1 shown in the table indicates the long register 12, and LR2 indicates the long register 13, and the arrow indicates that the calculation result on the right side is stored in the register on the left side. Rn or LRn on the right side of the arrow indicates data stored in the register Rn or LRn and Rni or LRni indicates brightness data of 8 bits from the 8×i-th bit to the 8×i+7-th bit of data stored in the register Rni or LRni. Symbol // indicates to connect brightness data or brightness data strings on both sides of //.

1 of the third operand of the long register

TABLE 1

| Instruction | Indication In Program List | Operation |
|---|---|---|
| Long register store instruction | 1dLR Rk, Rl | LRl ← Rk//Rl |
| Long register store & pixel calculation instruction | 1dLRdist Rj, Rk, Rl | LR2 ← Rk//Rl<br>$Rj \leftarrow \sum_{i=0}^{15} \vert LRl_i - LR2_i \vert$ |
| Long register update & pixel calculation instruction | updLRdist Rj, Rk, #1, #m | LR2 ← (LR2$_m$//LR2$_{m+1}$//<br>... LR2$_{15}$//Rk$_1$//RK$_{1+1}$<br>// ... Rk$_{1+m-1}$)<br>$Rj \leftarrow \sum_{i=0}^{15} \vert LRl_i - LR2_i \vert$ |
| Pixel calculation instruction | dist Rj, Rk, Rl | $Rj \leftarrow \sum_{i=0}^{7} \vert RK_i - Rl_i \vert$ |
| Pixel arrangement instruction | align Rj, Rk, Rl, #m | Rj ← (Rk$_m$//Rk$_{m+1}$// ... Rk$_7$<br>//Rl$_0$//Rl$_1$// ... Rk$_{m-1}$) |
| Addition instruction | edd Rj, Rk, Rl | Rj ← Rk + Rl |

(Wherein, LR1 and LR2 indicate a first and a second long register respectively. Rni indicates the portion from bit (8 × i) to bit (8 × i + 7) of Rn. Rk//Rl indicates a concatenation of Rk and Rl.)

update pixel instruction indicates the aforementioned position information 604 and #m of the fourth operand indicates the aforementioned shift amount information 605.

Figure 7:
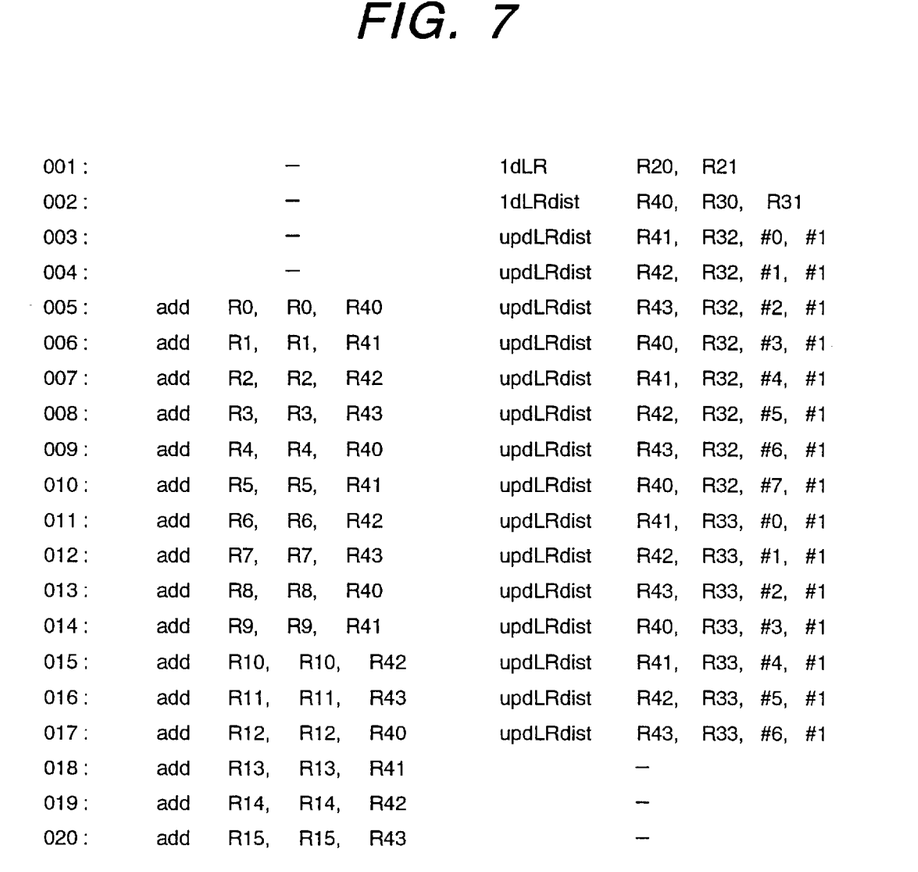
FIG. 7 is a drawing showing a program example of a processor of an embodiment of the present invention.

When the formats of the instructions are decided as mentioned above, the process for obtaining values of r (j, u, v) of Formula 3 from u=0 to u=15 for a specific combination of (j, v) can be realized by the program shown in FIG. 7.

However, the long register store pixel calculation instruction and the long register update pixel calculation instruction pixel calculator 11 can execute the pipe line process and the latency thereof is 3 steps. The latency of the addition instruction and the long register store instruction is 1 step. When a latch is inserted between each difference calculator 51 and the multi-input adder 52 shown in FIG. 4, the latency of the processing of the long register store pixel calculation instruction and the long register update pixel calculation instruction pixel calculator 11 is 3 steps.

Assuming that the addition instruction which is stored in the instruction register 30 and executed by the integer calculation processor 101 by the super scalar or VLIW architecture and another instruction which is stored and executed in the instruction register 31 as mentioned above can be executed at the same time, instructions which can be executed at the same time are described on one line.

As shown in FIG. 7, in a coating example, values of r (j, u, v) of Formula 3 from u=0 to u=15 obtained for a specific combination of (j, v) are stored in the registers R0 to R15 of the register file at the 20 steps.

In this program, in the right column, the brightness data of 16 pixels on a specific line of the current macroblock of the current frame stored in the registers R20 and R21 of the register file 2 is stored in the first long register 12 on the first line by the long register store instruction ldLR, and the difference between the brightness data of 16 pixels on the j-th line of the current macroblock stored in the first long register 12 and the brightness data of 16 pixels at the left end of a specific line of the search window stored in the registers R30 and R31 is obtained on the second line by the long register store pixel calculation instruction IdLRdist, and the brightness data of 16 pixels at the left end of a specific line of the search window is stored in the second long register 13. On the 3rd line to the 17th line, the brightness data stored in the second long register 13 is shifted 8 bits by the long register update pixel calculation instruction updLRdist, and the brightness data of the leftmost pixel in the second long register 13 is discarded, and the brightness data e rightmost pixel in the second long register 13 is read from the register file instead and connected data is generated, and the sum of the difference between the above data and the brightness data of 16 pixels on the j-th line of the current macroblock stored in the first long register 12 on the second line is obtained.

In the left column, the sum obtained on the second line to the 17th line of the right column is added sequentially on the 5th line to the 29th line by the addition instruction add. The latency of the processing of the pixel calculator is 3 steps. The add instruction starts from the 5th line 3 steps after the second line where an instruction for obtaining the aforementioned sum of differences is issued first.

Next, the program for realizing the process for obtaining values of r (j, u, v) of Formula 3 from u=0 to u=15 for a specific combination of (j, v) by the aforementioned conventional processor (see FIG. 11) is shown in FIG. 8 for reference.

As shown in Table 1 mentioned above, the instruction dist shown in the drawing is a pixel calculation instruction for executing the calculation indicated by Formula 2 and the instruction align is a pixel arrangement instruction for connecting two data of 64-bit width read from two registers of the register file, shifting them left m bits, and fetching 64 bits from the left as data after shifting.

The pixel calculation instruction dist can execute the pipe line process and the latency thereof is 2 steps. The latency of the addition instruction and the long register store instruction is 1 step. Assuming that different types of instructions executed by different calculation processors can be executed at the same time by the super scalar or VLIW architecture, instructions which can be executed at the same time are described on one line.

In this program, the sum of differences between the brightness data of 8 pixels among 16 pixels on a specific line of the current macroblock of the current frame and the brightness data of 8 pixels on a specific line of the search window is obtained by the pixel calculation instruction dist, and the obtained sum is added sequentially by the addition instruction add, and the process for updating 8 pixels on a specific line of the search window to the right by one pixel which is used for the next calculation is executed by the pixel arrangement instruction align repeatedly 16 times starting from the leftmost 8 pixels on a specific line of the search window.

Alternately with this process, the sum of differences between the brightness data of the remaining 8 pixels among 16 pixels on a specific line of the current macroblock of the current frame and the brightness data of 8 pixels on a specific line of the search window is obtained by the pixel calculation instruction dist, and the obtained sum is added sequentially by the addition instruction add, and the process for updating 8 pixels on a specific line of the search window to the right by one pixel which is used for the next calculation is executed by the pixel arrangement instruction align repeatedly 16 times starting from the rightmost 8 pixels on a specific line of the search window. However, this program is simplified to an extent that the outline can be understood unlike the processor UltraSPARC mentioned above.

As shown in FIG. 8, when the aforementioned process is realized by this instruction, 49 steps are required.

When FIG. 7 is compared with FIG. 8, the processor of this embodiment can execute this process at a high speed of about 2.5 times. The reason is that the processor having the constitution of this embodiment can execute calculation between brightness data of 16 pixels at a time in the pixel calculator 11 and can realize update of the brightness data of 16 pixels of the search window which is used for calculation and calculation between the updated data and 16 pixels of the current macroblock by one instruction. Furthermore, the hardware amount increased by the first long register 12, the second long register 13, the long register update device 14, and the pixel calculation source selector 15 which are used in this embodiment is smaller than the hardware increase amount when the number of reading ports of the register file is increased or the bit width of the register file is increased.

In the aforementioned embodiment, the pixel calculator 11 executes the calculation indicated by Formula 4. However, the pixel calculator 11 may execute another calculation or may execute calculation of general data instead of pixels. For example, the pixel calculator 11 may calculate the formula indicated by Formula 5.

$$D = \sum_{i=0}^{15} (X_i \times Y_i) \tag{5}$$

Figure 9:
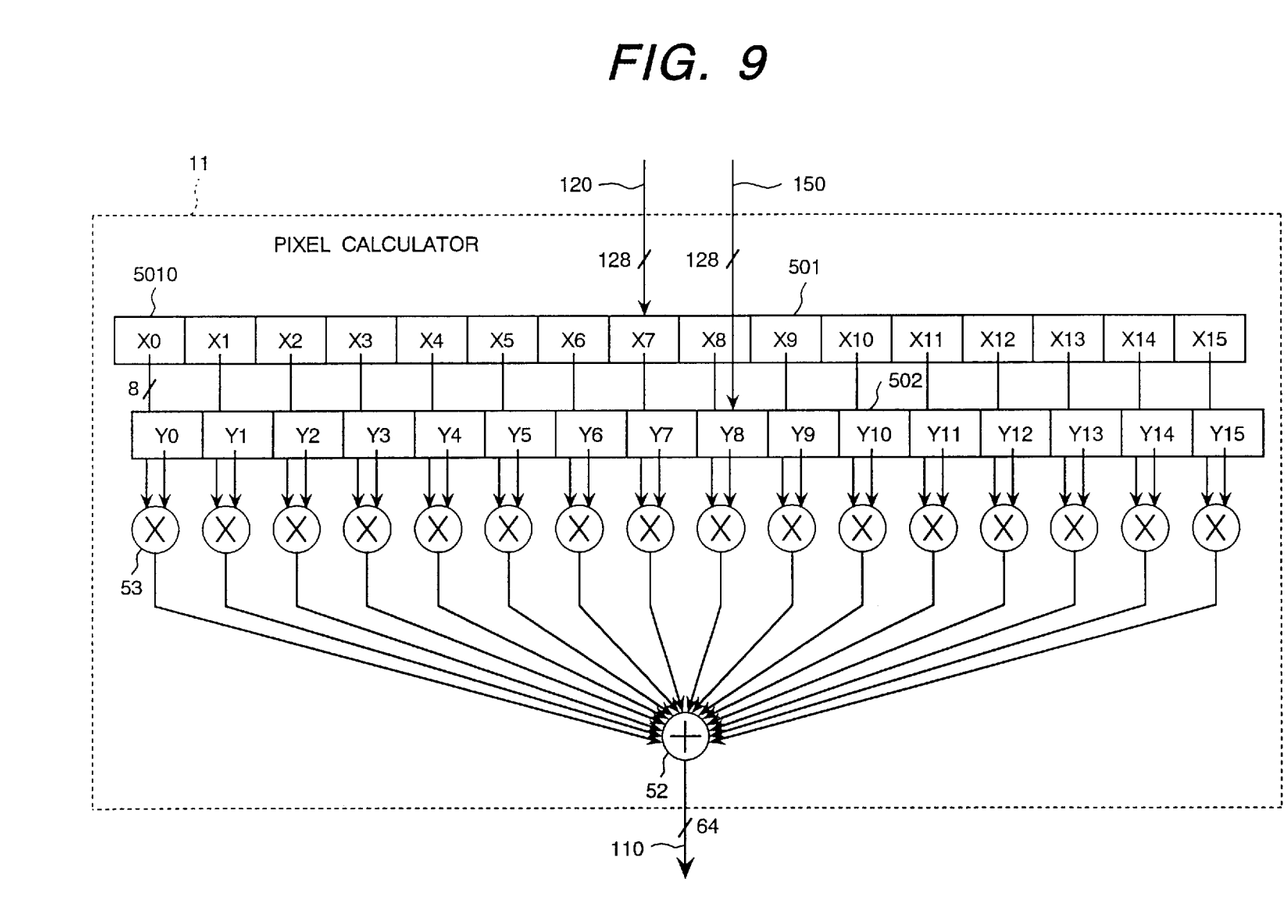
FIG. 9 is a block diagram showing another constitution example of a pixel calculator of an embodiment of the present invention.

The constitution of the pixel calculator 11 in this case is shown in FIG. 9. As shown in the drawing, the pixel calculator 11 has a constitution that the difference calculators 51 in the constitution shown in FIG. 4 are replaced with multipliers 53. Each multiplier 53 is a multiplier for calculating the product of two element data. This pixel calculator 11 can be applied to filter calculation of time series data such as indicated by Formula 6.

$$y_t = \sum_{i=0}^{15} (w_i \times x_{i+t}) \tag{6}$$

By this application, a filter which has many taps, accordingly provides a satisfactory response characteristic, and processes data at high speed can be realized.

What is claimed is:

1. A processor having a register file comprising a plurality of registers of N-bit width including at least two registers which can read data in parallel, comprising:

an instruction register for storing an instruction;

a first long register of M-bit width (M>N);

an update device for generating data of M-bit width obtained by replacing a part of data read from said first long register with a part of data read from said register file according to said instruction stored in said instruction register;

a selection device for selecting one of data of M-bit width connected to data read from a plurality of registers of said register file in parallel and said data of M-bit width generated by said update device according to said instruction stored in said instruction register;

a calculator for executing a predetermined calculation for said data of M-bit width selected by said selection device according to said instruction stored in said instruction register, wherein said first long register stores said data of M-bit width selected by said selection device according to said instruction stored in said instruction register; and a second long register of M-bit width for storing said data of M-bit width connected to data read from a plurality of registers of said register file in parallel according to said instruction stored in said instruction register; and wherein said calculator executes said predetermined calculation between said data of M-bit width selected by said selection device and said data of M-bit width read from said second long register according to said instruction stored in said instruction register.

2. A processor according to claim 1, wherein when a first kind of instruction is stored in said instruction register, said second long register stores said data of M-bit width connected to data read from a plurality of registers of said register file in parallel, and when a second kind of instruction is stored in said instruction register, said selection device selects said data of M-bit width connected to data read from a plurality of registers of said register file in parallel, and said first long register stores said data of M-bit width selected by said selection device, and said calculator executes said predetermined calculation between said data of M-bit width read from said second long register and said data of M-bit width selected by said selection device, and when a third kind of instruction is stored in said instruction register, said update device generates data of M-bit width obtained by replacing a part of data read from said first long register with a part of data read from said register file, and said selection device selects said data of M-bit width generated by said update device, and said first long register stores said data of M-bit width selected by said selection device, and said calculator executes said predetermined calculation between said data of M-bit width read from said second long register and said data of M-bit width selected by said selection device.

3. A processor according to claim 1, wherein the calculation executed by said calculator is a calculation for obtaining, for each of a plurality of first element data obtained by dividing said data of M-bit width selected by said selection device into a plurality of parts, an absolute value of the difference between said first element data and second element data corresponding to said first element data with respect to the position in said data of M-bit width among a plurality of second element data obtained by dividing said data read by said second long register into a plurality of parts and obtaining the total of absolute values of differences obtained for each first element data.

4. A processor according to claim 1, wherein the calculation executed by said calculator is a calculation for obtaining, for each of a plurality of first element data obtained by dividing said data of M-bit width selected by said selection device into a plurality of parts, the product of said first element data and second element data corresponding to said first element data with respect to the position in said data of M-bit width among a plurality of second element data obtained by dividing said data read by said second long register into a plurality of parts and obtaining the total of products obtained for each first element data.

* * * * *